(12) United States Patent
Ackerman

(10) Patent No.: US 9,176,722 B1
(45) Date of Patent: Nov. 3, 2015

(54) WEB MANAGEMENT SOFTWARE CONFIGURATION AUTOMATION

(71) Applicant: Bank of America Corporation, Charlotte, NC (US)

(72) Inventor: Kevin J. Ackerman, Albany, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 48 days.

(21) Appl. No.: 14/298,583

(22) Filed: Jun. 6, 2014

(51) Int. Cl.
  *G06F 9/44* (2006.01)
  *G06F 9/445* (2006.01)
  *H04L 29/08* (2006.01)

(52) U.S. Cl.
  CPC . *G06F 8/61* (2013.01); *H04L 67/02* (2013.01)

(58) Field of Classification Search
  CPC ......................................................... G06F 8/61
  See application file for complete search history.

(56) References Cited

U.S. PATENT DOCUMENTS

| | | | |
|---|---|---|---|
| 6,006,035 A * | 12/1999 | Nabahi | 717/175 |
| 6,463,528 B1 * | 10/2002 | Rajakarunanayake et al. | 713/1 |
| 7,958,485 B2 * | 6/2011 | Steiner et al. | 717/103 |
| 2002/0112232 A1 * | 8/2002 | Ream et al. | 717/176 |
| 2003/0195921 A1 * | 10/2003 | Becker et al. | 709/200 |
| 2009/0293053 A1 * | 11/2009 | Knatcher | 717/175 |
| 2010/0058327 A1 * | 3/2010 | Dehaan | 717/176 |
| 2011/0246981 A1 * | 10/2011 | Braun et al. | 717/175 |

* cited by examiner

*Primary Examiner* — Philip Wang
(74) *Attorney, Agent, or Firm* — Michael A. Springs; Moore & Van Allen PLLC; W. Kevin Ransom

(57) ABSTRACT

Systems, methods, and computer program products are provided for installing web management software on an entity server by communicating requests to entity servers for the purpose of executing instruction on the entity servers. As an example, the system receives installation parameters comprising hardware, software, and network information associated with an entity server and based on these installation parameters, generates a list of commands to install web management software on an entity server, wherein each command is executable by the entity server for performing a function to install the web management software on the entity server. The system initiates a server communication session with the entity server, and for each command in the list of commands, communicates a request comprising the command to be executed by the entity server, wherein the requests are sent in a selected order and at selected times to install web management software on the entity server.

21 Claims, 7 Drawing Sheets

WEB MANAGEMENT SOFTWARE CONFIGURATION AUTOMATION

FIELD

In general, embodiments of the invention relate to systems, methods, and computer program products for installing web management software on entity servers.

BACKGROUND

Typically an institution requires the use of servers running web management software in order to display data and allow for the operation of business functions. Installing a web management may require significant time and resources. There exists a need for automating the installation process of web management software on servers collectively operated by an institution.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of all embodiments. Its sole purpose is to present some concepts of one or more embodiments in a simplified form as a prelude to the more detailed description that is presented later.

Embodiments of the invention address the above needs and/or achieve other advantages by providing methods, computer program products, and systems for installing a web management system on an entity server. According to embodiments of the invention, a system may be provided for installing web management software, whereby the system communicates requests to entity servers for the purpose of executing instructions on the entity servers. The system comprises a storage device with computer-readable program code stored thereon, and a communication device, and a computer processing device operatively coupled to the storage device and communication device. The computer processing device is configured to execute the computer-readable program code to receive installation parameters for installing web management software on an entity server, wherein the installation parameters comprise hardware, software and identification parameters associated with the entity server. Based upon the installation parameters, the computer processing device generates a list of commands to install web management software on the entity server, wherein each command in the list of commands is executable by the entity server for performing a function to install the web management software on the entity server. The computer processing device initiates a server communication session with the entity server, and for each command in the list of commands, communicates, via said communication device, a request comprising the command whereupon the command is to be executed by the entity server, wherein the requests are sent in a selected order and at selected times to install web management software on the entity server.

In some embodiments, the system may be further configured to communicate installation files executable by the entity server, wherein the installation files comprise instructions necessary for installing the web management software on the entity server. In some embodiments, at least one of the commands comprises a desired completion status and an alternative function, and wherein the computer processing device, after communicating a request comprising the command to the entity server, the computer processing device is further configured to execute the computer-readable program code stored on said storage device to: receive a response comprising a completion status of the execution of said command by the entity server; compare the completion status against a desired completion status associated with the command; and perform the alternative function associated with the command based upon the comparison of the completion status and the desired completion status.

In some embodiments, each command in the list of commands further comprises a condition for executing the command; and wherein the computer processing device is further configured to execute the computer-readable program code stored on the storage device to analyze whether the condition is satisfied; and communicate the command based in part on the condition.

In some embodiments, the system is further configured to receive a list of functions of the web management software; for each function in the list of functions, create tests, wherein the tests comprise parameters and a desired response; and for each test communicate a request to the entity server comprising the parameters such that the entity server performs the function based upon the parameters; based upon communicating the request, receive the response from the entity server; and compare the response from the entity server against the desired response associated with the test.

In some embodiments, the command in the list of commands may comprise instructions for the entity server to perform at least one of executing a file on the entity server, starting an application associated with the entity server, stopping an application associated with the entity server, sending a request to another server, and/or restarting the entity server.

In some embodiments, the entity server further comprises web applications managed by the web management software, and wherein communicating a request to the entity server comprises at least one of configuring the web application, starting the web application, stopping the web application, and/or setting network parameters for the web application.

In addition to the above described system, the present invention also provides methods for performing the above described operations of the system and computer program products that comprise instruction codes that cause a computer processing device to perform the above described operations of the system.

BRIEF DESCRIPTION OF THE DRAWINGS

Figure 1:
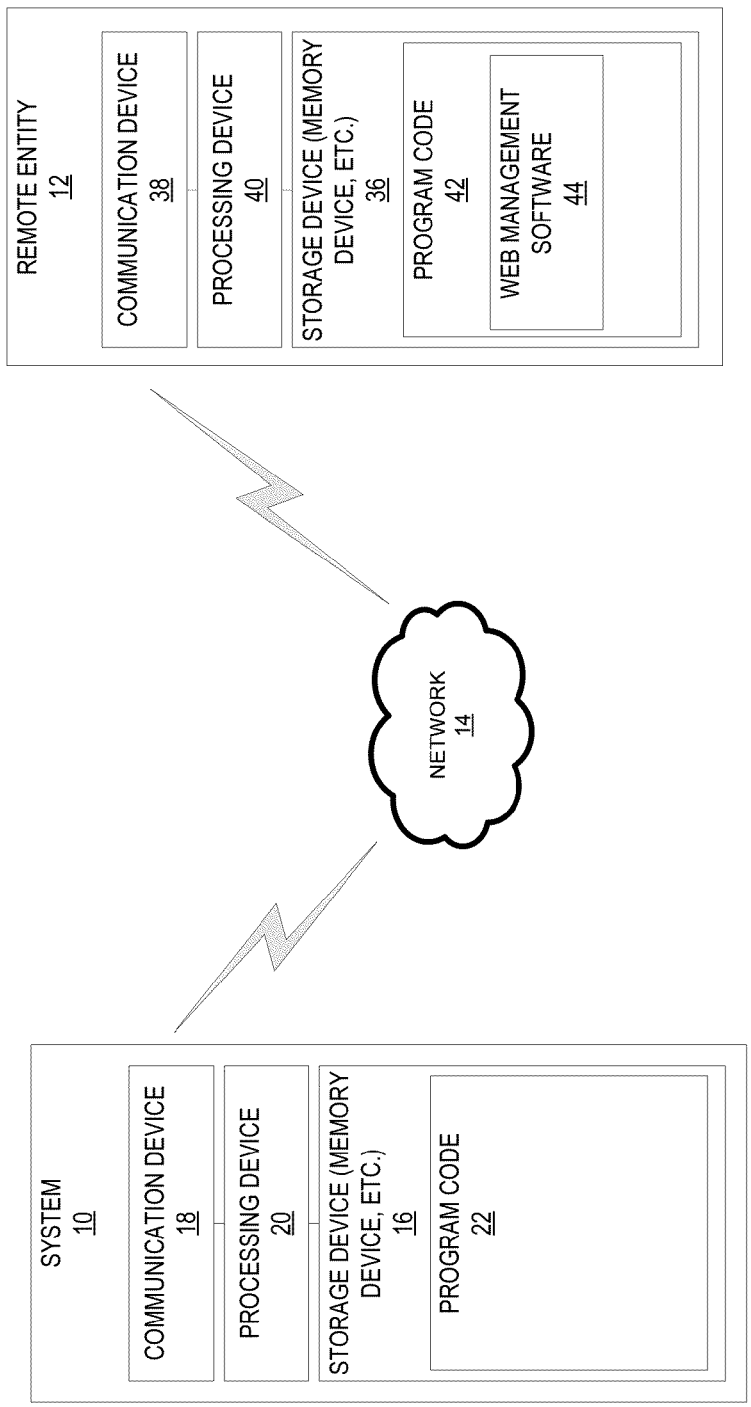
Figure 2:
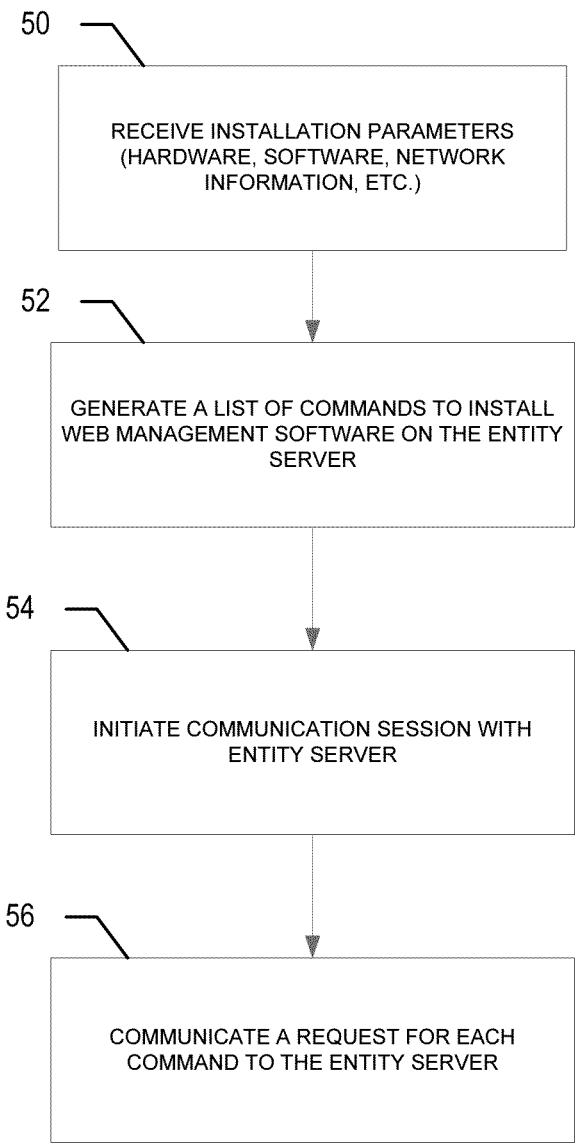

Having thus described embodiments of the invention in general terms, reference will now be made to the accompanying drawings, which are not necessarily drawn to scale, and wherein:

FIG. 1 is a block diagram illustrating a generalized embodiment of the system in a network environment according to one embodiment of the present invention;

FIG. 2 is an operational diagram of a general embodiment of the present invention for installing web management software on entity servers.

Figure 3A:
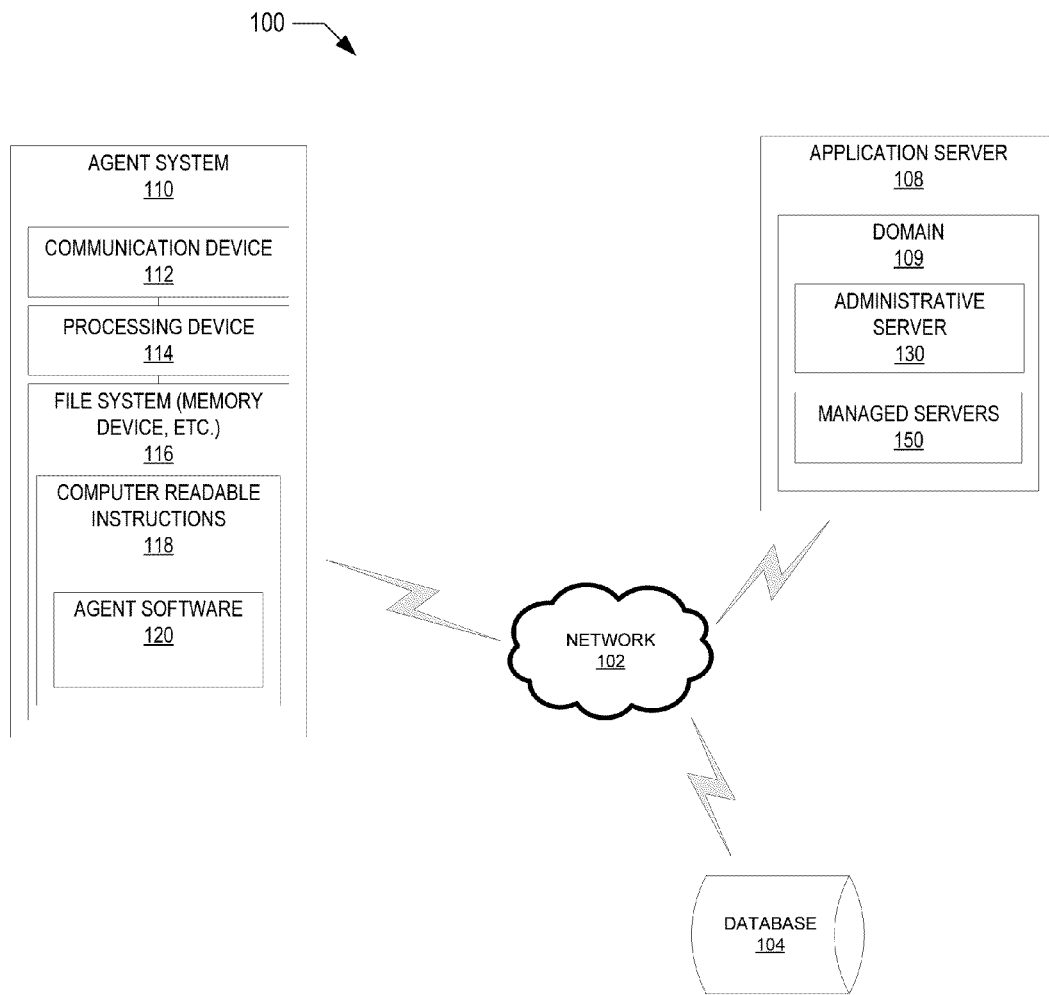
Figure 3B:
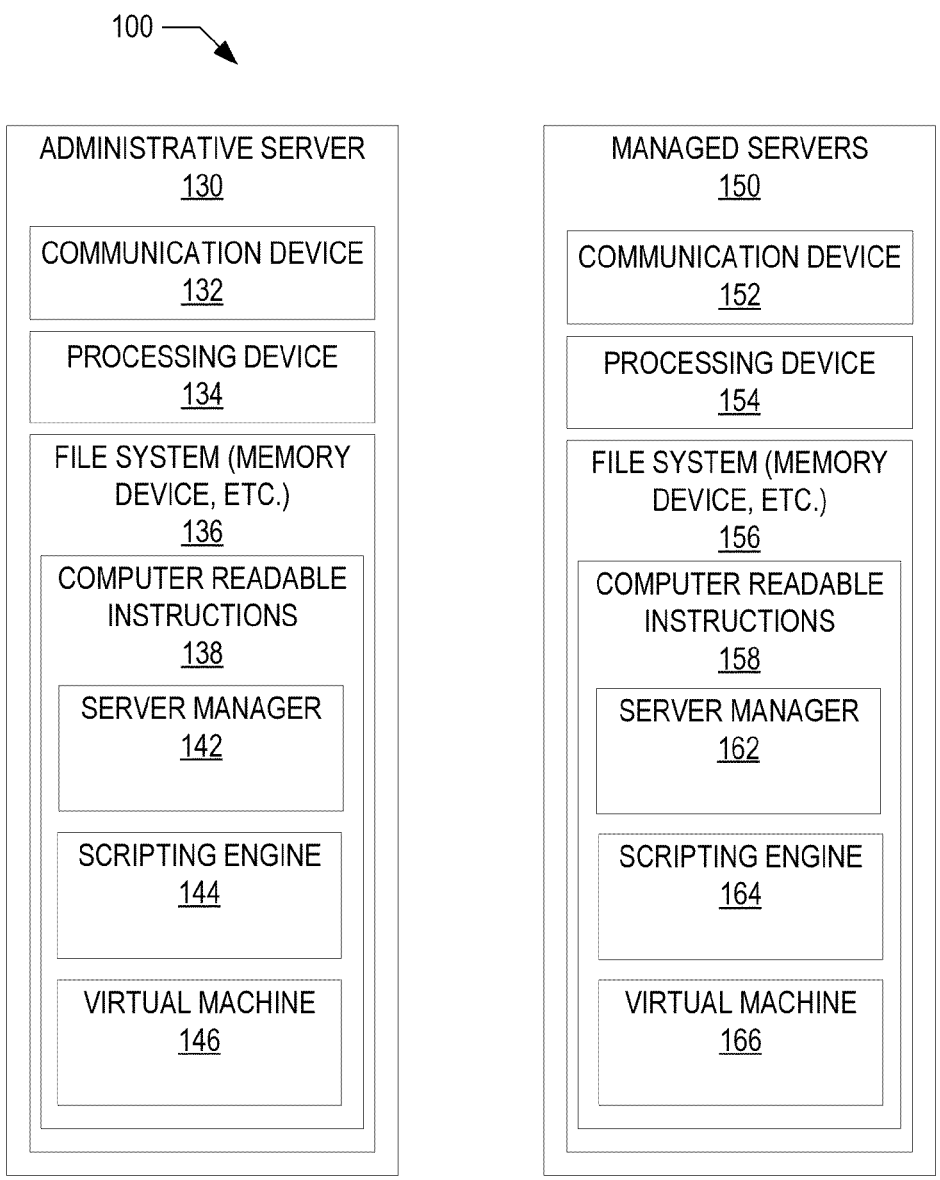
Figure 4:
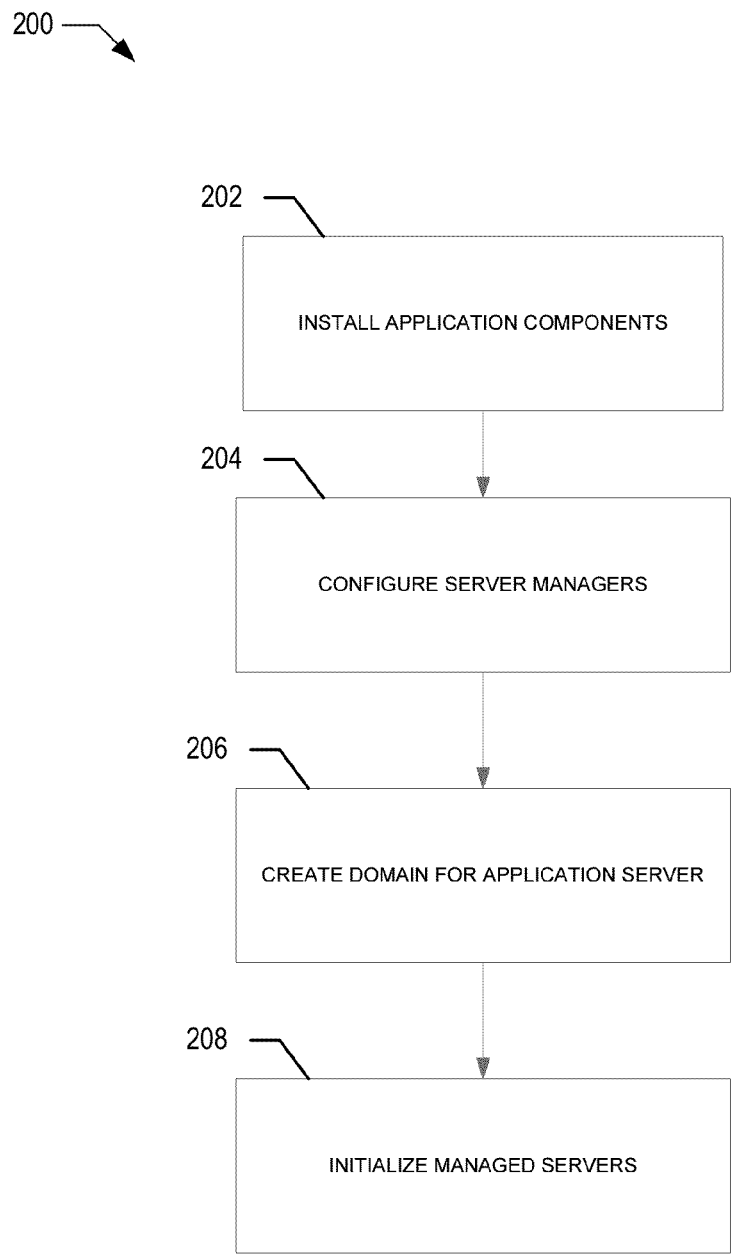

FIGS. 3A and 3B. are block diagrams of an example environment, in which the systems, methods, and computer program products of the present invention may operate according to one or more embodiments of the invention;

FIG. 4 is an operational diagram illustrating a method according to one embodiment of the present invention for installing web management software on entity servers.

Figure 5:
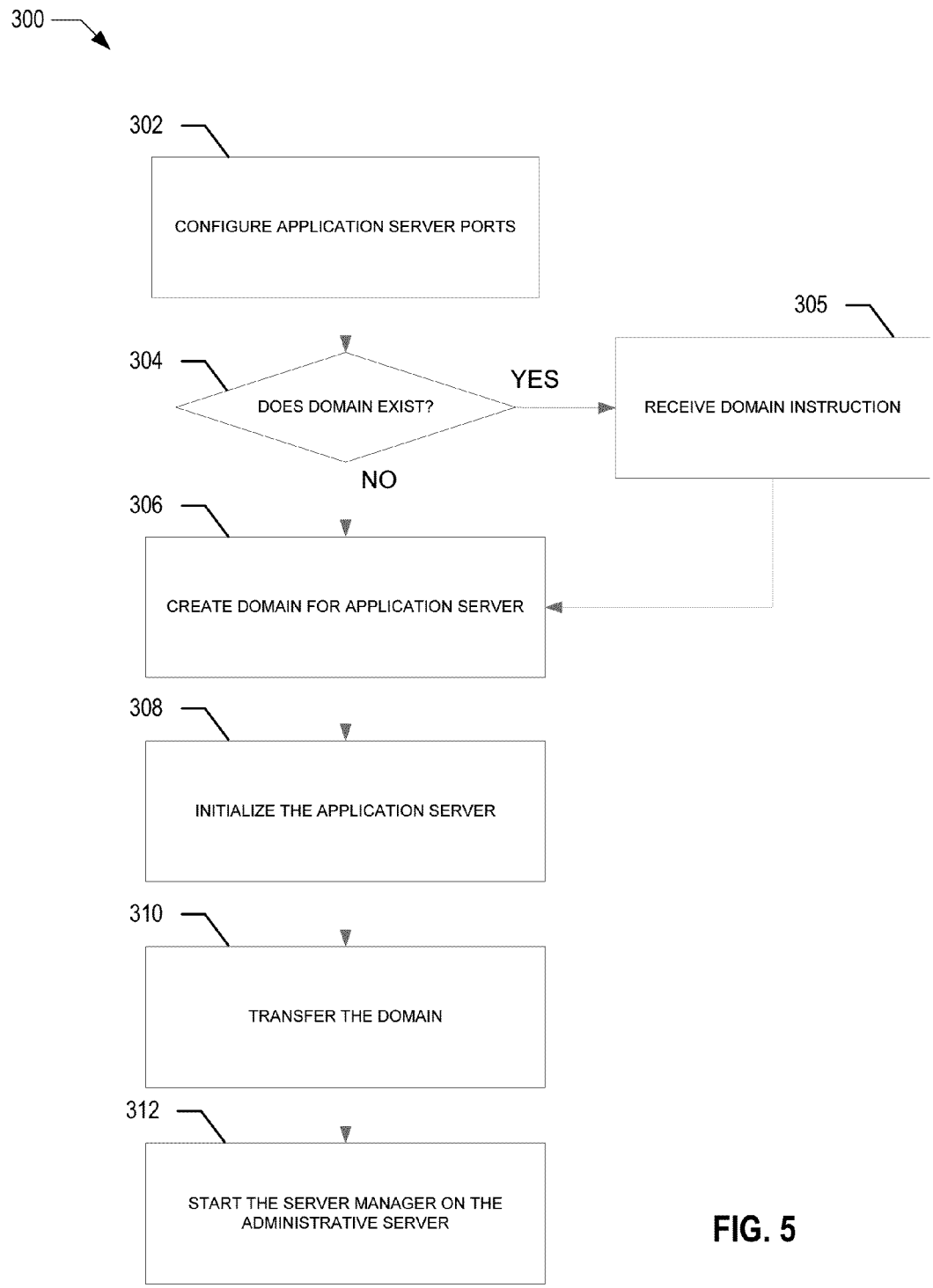

FIG. 5 is an operational diagram illustrating a method according to one embodiment of the present invention for creating a domain for the application server.

Figure 6:
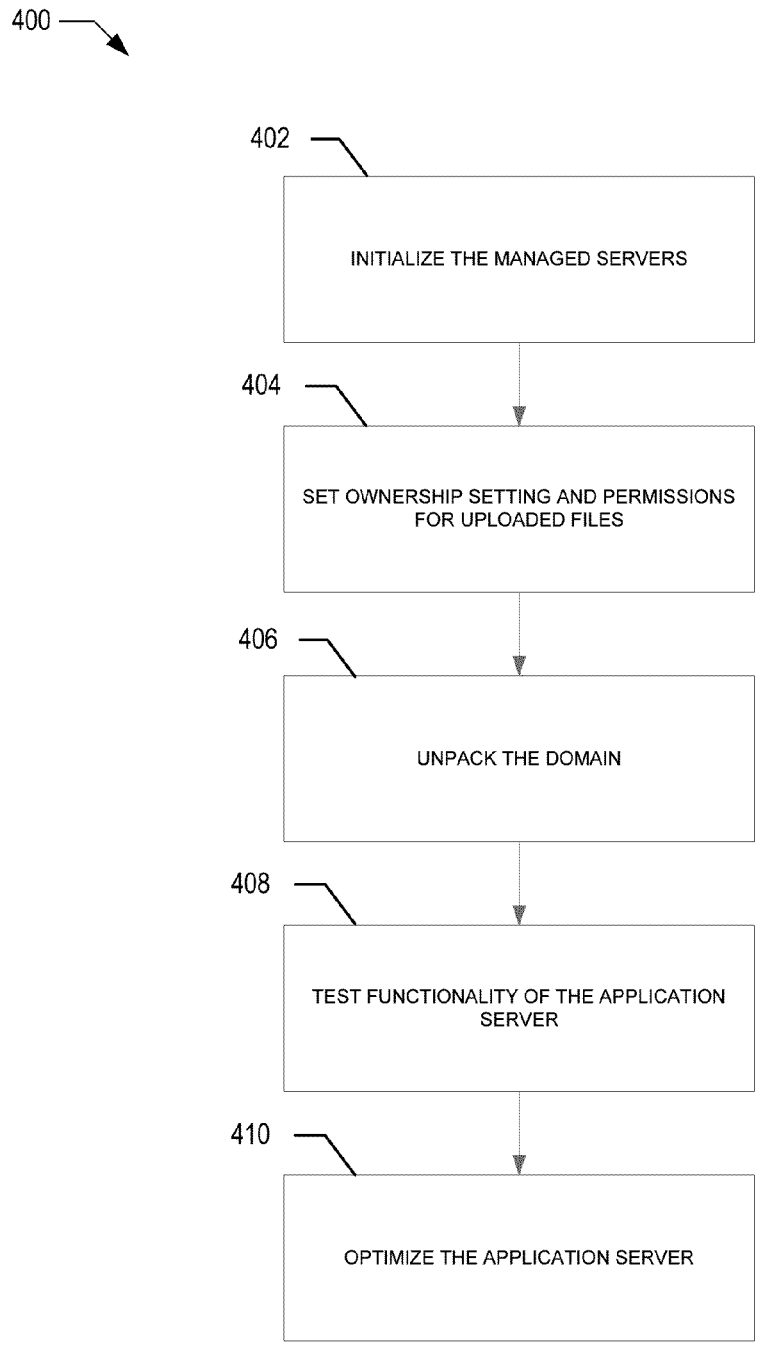

FIG. 6 is an operational diagram illustrating a method according to one embodiment of the present invention for unpacking the domain on the managed servers.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, embodiments of the present invention use the term "user." It will be appreciated by someone with ordinary skill in the art that the user may be an individual, financial institution, corporation, or other entity that may have documents associated with accounts, transactions, or the like with the entity providing the system. The term "group" as presented herein may refer to one or more lines of business, groups, subsidiaries, business partners, or the like that are associated with an entity that has financial regulatory reporting.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein, unless the claims clearly indicate otherwise; rather, these embodiments are provided so that this disclosure will satisfy applicable legal requirements. Like numbers refer to like elements throughout. It should be also appreciated that, although embodiments of the invention are generally described herein with regard to financial institution servers, other embodiments of the invention may benefit individuals or business or non-business entities—other than financial institutions—that operate web management software.

In general, embodiments of the present invention provide systems, methods, and computer program products for installing web management software on entity servers.

As referenced herein, the term "application", unless further limited by the context shall refer to program, method, or computer program product which is executed by a server that is deployed on and managed by an application server. An application may also be referenced as a "web application" in which the application is hosted on a server and is accessed from a client using an address on the server known as a port.

The term "domain", unless further limited by the context, shall refer to a group of server and/or other computing devices where each server or device is configured to be accessed and administered with a common set of rules. A server that is part of a domain may filter communications that the server receives from other computing devices. In this manner, the domain provides security to the servers that are part of the domain. Additionally, the domain may provide administration of the servers in the domain. For example, one of the servers in the domain may act as an administrator where it sends commands to managed servers in the domain. For example, in a web managed domain, contains an administration server and several managed servers. Each managed server in the domain is capable of hosting a particular web application. The administrative server may send commands to the managed servers to startup or shutdown applications in order to optimize resources. In another example of a domain, each server in the domain may have specific functionality such as a printing function. The administrative server may register each managed server and the functionality of the applications running on the managed server and broadcast that functionality to other servers in the domain. In this manner, each server may be able to discover the functionality of all the other servers. In addition to providing the registry of the functionality, the administrative server may also provide common rules or protocols for accessing the functionality; therefore, the administrative server may act as a common gateway. In this manner, two servers in the same domain that utilize different protocols may still communicate with one another using the administrative server as a gateway.

The term "scripting engine", unless further limited by the context shall refer to a compiled program stored within the computer readable instruction of the file system of a server, computing system, or the like and executes scripts during run time. Further, the term "scripts" shall refer to code which is non-compiled and is executed at run time. Scripts are not necessarily limited in functionality compared to a typical compiled program. However, the script is limited in functionality in as much as the scripting engine which interprets the script has the functionality to perform the function. For example, a scripting engine may include the functionality to communicate and receive messages over a network using a given protocol. The script may include a command for the scripting engine to send a message to a remote server using the protocol. Additionally, if the scripting engine lacked the functionality to send the message over a network and where a script has a command for the scripting engine to send a script over the network, the scripting engine would be unable to comply with the command. Where a scripting engine lacks a function and the function is requested, the scripting engine may generate an error associated with the function.

When the web application uploaded to an application server is a script, the application server will utilize a scripting engine in order to execute the script. For example, where a web application is uploaded to an application server and consists of a script, the application server would store the web application in memory. When a user requested the start of the web application, the application server would send the script to a scripting engine for execution. The script would give commands to the scripting engine to perform functions. When the user requests the termination of the web application, the application server would send a termination command to the scripting engine to cease the functionality commanded by the script. Scripts may include code written in the following languages but are not limited to Javascript, Python, Ruby, Perl, PHP, Unix Shell Scripts, and the like.

Unless otherwise limited, the term "server manager" as described within this application shall be defined as a system, method, or process for accepting requests from a remote entity which causes the system upon which the server manager is installed to perform a function associated with the request, or sending requests to a remote entity in order for the remote entity to perform a function associated with the request. In some embodiments, the server manager may be limited to either sending requests or receiving requests. Where the server manager is configured to only receive requests, the server manager may limit the remote entities from which the server manager may receive a request from. Additionally, the server manager may also limit the type of functions that the server manager will perform based in part on the remote entity sending the request. For example, a first server has a server manager installed and is configured to send requests in which a server is requested to start and stop a first and a second process. A second server has a server manager installed and is configured to receive requests. The second server may is configured to only accept requests from the first server. Additionally, the second server is has the functionality to start and stop both a first and a second process and is configured to receive requests from the first server to start and stop the first process only. When the first server sends a request to the second server to start the first process, the second server will handle the request. However, if the first server were to send a request for the second server to start the second process, the second server would reject the request. Additionally, if a third server configured to send requests were to send a request to the second server to start the first request, the second server would reject the request. In some embodiments, the server manager is an application that is deployed and managed by an application server. Additionally, the server manager may provide a user interface by which a user may interact with the server manager.

Where the server manager is configured to send requests, the server manager may send a single request to multiple servers. For example, a first server is configured to send requests to other servers to start and stop a first process. A second server and third server are configured to receive requests and both contain the functionality to start and stop the first process. In such a case, the first server may send a single request to both the first and second servers to start the first process upon which the second and third servers handle the request and start the first process uniquely. Additionally, the server manager may be configured to receive responses after sending a request.

FIG. 1 discloses a general environment in which systems, methods, and computer program products of the present invention may be implemented. In this example embodiment, a system 10 is provided for installing web management software on a remote entity server 12 via a network 14. The system 10 comprises a storage device 16 with computer-readable program code stored thereon, a communication device 18, and a computer processing device 20 operatively coupled to the storage device and the communication device. The system is in communication with the entity server via the network.

FIG. 2 illustrates a generalized operation diagram for installation of web management software on the remote entity server 12 of FIG. 1. In this embodiment, the computer processing device 20 receives, via the communication device 18, installation parameters comprising hardware, software, and network information associated with the remote entity server (see block 50). Based upon the installation parameters, the computer processing device 20 generates a list of commands to install web management software on the entity server 12, wherein each command in the list of commands is executable by the entity server for performing a function to install the web management software on the entity server (see block 52).

With reference to block 54, the computer processing device 20 may initiate a server communication session with the entity server 12. (See block 54). For each command in the list of commands, the computer processing device communicates a request comprising the command to be executed by the entity server, wherein the requests are sent in a selected order and at selected times to install web management software on the entity server. (See block 56).

In some embodiments, the request transmitted to the entity server (see block 56) may include installation files executable by the entity server, where the installation files comprise instructions necessary for installing the web management software on the entity server.

In some embodiments, the request transmitted to the entity server (see block 56) includes one or more commands with an associated desired completion status and an alternative function. In this embodiment, after the computer processing device communicates the command to the entity server, the computer processing device is further configured to receive a response comprising a completion status of the execution of the command by the entity server, compare the completion status against a desired completion status associated with the command, and perform the alternative function associated with said command based upon the comparison of the completion status and the desired completion status. For example, the request communicated by the computer processing device to the entity server may generate an error on the entity server. The entity server may communicate a response stating the error. Upon receiving the response with the error, the computer processing device may send an alternative command to the entity server in order to correct the error and proceed with the installation process.

In some embodiments, each command in the list of commands comprises a condition that must be satisfied prior to the computer processing device communicating the command to the entity server. The computer processing device analyzes the condition to determine whether the condition has been satisfied and if the computer processing device determines that the condition is satisfied, the computer processing device communicates a request for the command. The condition may refer to receiving a particular response or multiple responses from the entity server, or it may refer to another test or function performed by the computer processing device. In this manner, the computer processing device does not need to work in a linear fashion wherein. For example, instead of the computer processing device sending out one command at a time and waits for a response, the computer processing device is constantly analyzing the conditions of the commands and communicating the command once the condition for that command is satisfied.

In some embodiments, a request sent to the entity server may comprise instructions for the entity server to perform at least one of executing a file on the entity server, starting an application associated with the entity server, stopping an application associated with the entity server, sending a request to another server, and/or restarting the entity server.

In some embodiments, the entity server may further comprise web applications stored thereon that are managed by the web management software. In this embodiment, some requests communicated to the entity server by the computer processing device may comprise at least one command for configuring the web application, starting the web application, stopping the web application, and/or setting network parameters for the web application.

In some embodiments, the system may be configured to perform functional testing of the web management software. In this embodiment, the computer processing system receives a list of functions of the web management software, and for each function in the list of functions, creates tests. The tests comprise parameters and a desired response. For each test, the computer processing system communicates a request to the entity server comprising the parameters such that the entity server performs the function based upon the parameters. Based upon communicating the request, the computer processing device receives a response from the entity server and compares the response with the desired response associated with the test.

FIGS. 1 and 2 illustrate generalized embodiments of the present invention. FIGS. 3-6, as described below, illustrate specific examples of the concepts of the present invention.

Referring now to FIG. 3A, a block diagram is shown of an example environment 100 is shown, in which the systems, methods, and computer program products of the invention may operate according to one or more embodiments of the present invention. FIG. 3A illustrates an environment 100 in which an agent system 110, an application server 108, and a database 104, interact over a network 102. In some embodiments, one or more of the systems 110, 104 and 108 communicate directly with one another.

In various embodiments, the agent system 130 is a computer system that interacts with a user 108, organization's servers, other online content, and the like. Interaction with network components may occur by sending requests to the components over the network 102 to cause the network components to perform a function associated with the request. For example, the agent system may send a request to a server for the server to execute a start command for an application stored on the server.

The agent system 110 includes, in the embodiment shown, a computer processing device 114 communicatively coupled with a communication device 112 and a file system 116 stored in a storage device. The computer processing device, in some embodiments, is configured for controlling operation of the communication device 112 in order to communicate across the network 102, such as, for example, with the administrative server 130, the managed server 150, the database 104, and the data store 106. The file system 116 is or includes a storage device or other memory configured for storing computer readable instructions 118 such as an operating system, applications, other computer program code and the like. In some embodiments, the computer readable instructions include an agent software 120 configured for instructing the computer processing device 114 to send requests to entity servers over the network 102 in order to install web management software on the administrative server 130, and the managed servers 150.

In some embodiments, the network 102 is an intranet or other local area network (LAN) and the agent system 110, the administrative server 130, the managed server 150, the database 104, and the data store 106 are all part configured for communicating with one another across the intranet.

The database 104, in some embodiments may be a program, process, or computer program product for reading and writing data to memory which is persistent. The database 104 is capable of communicating over the network 102 with other servers in which the database may receive requests to at least create a record associated with the request comprising, update a record associated with the request, destroy a record associated with the request, retrieve data from a record associated with the request. In some embodiments, the database may be a relational database, wherein the database contains tables which hold records of the same type. The table in a relational database is formed using a schema, wherein fields are assigned which comprise of a value type (number, string, Boolean, etc.). Records inserted into the table conform to the schema of the table. Each table in the relational database is capable of relating to other tables in the database.

In other embodiments, the database may be a modeless database in which data is stored in objects which do not conform to a schema. Each object is capable of storing data in a key value pair in which a field is created which in is assigned a value. The value may comprise of multiple points of data such as an array or may comprise of another object.

The application server 108, in some embodiments, is a server designed to deploy and manage servers which execute web based applications. The application server 108 provides a method of communication between the servers deployed on the application server 108. In some embodiments, the application server 108 groups servers together using a domain 109.

In some embodiments, the domain 109 of the application server 108 contains an administration server 130 which has the purpose of administrating managed servers 150 within the domain 109. In some embodiments, the administrative server 130 performs load balancing between managed servers 150, create redundancy between managed servers of a similar type, provide a user interface for a user to interact with the administrative server 130 and other managed servers in the domain 109, monitor status of managed servers, and the like.

In some embodiments of the invention, the application server 108 may have multiple domains. Within a domain, any managed server may communicate with another server in the sub domains they are configured for. Each domain has, theoretically, one administrative server. However, in each domain, the managed servers are restricted from communicating to managed servers in another domain even though they are part of the same application server. Where multiple domains exist within an application server 108, the administrative server 130 is a part of only one domain.

Referring now to FIG. 3B, a block diagram of environment 100, in which systems operate according to embodiments of the present invention is shown. FIG. 3B demonstrates an administrative server 130 and managed servers 150.

In embodiments where an administrative server is present, the administrative server 130 includes a computer processing device 134 communicatively coupled with a communication device 132 and a file system 136, such as a storage device or memory. The computer processing device 134 is configured for controlling operation of the communication device 132 for communicating over the network 102 such as with the agent system 110, the managed servers 150, the database 104, and the data store 106. The file system 136 is configured for storing computer readable instructions such as the application server 140, the web management software 142, the scripting engine 144, the compiler 146, an operating system, other computer executable program code, applications, and the like. Further, the file system 136, in some embodiments, may be configured to store scripts executable by the scripting engine 144, and other non-executable files. The computer processing device 134 is configured for accessing and retrieving some or all the computer readable instructions 138 from the file system 136 and executing some or all of them.

In some embodiments, the administrative server 130 may include a server manager 142 in the computer readable instructions 138 of the file system 136. Where the administrative server includes a server manager 142, the administrative server will perform administrative functions by communicating with the managed servers 150 using the server manager 142.

The managed servers 150, in some embodiments, are servers such as organizational servers. In other embodiments, the managed servers 150 each include a computer processing device 154 which is communicatively coupled with a communication device 152 and a file system 156, such as a storage device or memory. The computer processing device 154 is configured for controlling operating of the communication device 152 for communicating over the network 102 such as with the agent system 110, the administration server 130, the database 104, and the data store 106. The file system 136 is configured for storing computer readable instructions such as the application server 160, the web management software 162, the scripting engine 164, the compiler 166, an operating system, other computer executable program code, applications, and the like. Further, the file system 136, in some embodiments, may be configured to store scripts executable by the scripting engine 144, and other non-executable files. The computer processing device 134 is configured for accessing and retrieving some or all the computer readable instructions 138 from the file system 136 and executing some or all of them.

In some embodiments, the computer readable instructions 158 of the managed servers 150 may include a server manager 162. In some embodiments, the server manager 162 is configured to receive requests from the other servers. Further, the server manager 162 may be configured to limit requests from other server to requests from the administration server 130. In some embodiments, the server manager 162 is an application that is deployed upon and managed by the application server 160.

Referring now to FIG. 4, an operational diagram illustrates a method 200 for installing web management software on entity servers. With reference to block 202 application components are installed on the administrative server 130 and the managed servers 150. In some embodiments, the agent system 110 sends to the file system 136, 156 of the administrative server 130 and the managed servers 150 files necessary to install the web management software. In some embodiments, the files are executable files that are executed by the administrative server 130 and the managed servers 150. The file may comprise machine code capable of being executed by the computer processing devices 134, 154. In other embodiments, the files may comprise a script that includes instructions for a scripting engine 144, 164. As stated above, the scripting engine is machine code that is executable by the computer processing devices 134, 154. The scripting engine 144, 164 interprets the instructions from the script and performs functions similar to that of an executable file containing machine code. Because the scripting engine processes the instructions during run time of the machine, the scripts executed by the scripting engine do not need to be compiled code. Examples of scripting engines include PHP, Javascript, Ruby, Python, etc. In other embodiments, the files communicated to the administrative server 130 and the managed servers 150 are non-executable files but contain information necessary for the installation process. For example, the file may contain data necessary for the configuration of a server such as addresses of the server, identification of the server, software currently installed on the server, hardware specifications of the server, and log files.

At block 204, the server managers are configured. In some embodiments, the agent system 110 communicates a properties file to the administrative server 130 and each of the managed servers 150. The properties file includes data necessary to properly configure the server manager on the administrative server 130 and the managed servers 150. Such information may include but is not limited to the IP address of the system upon which it is installed, a domain name, an IP address of other systems on the network, and the like. In some embodiments, the properties file is automatically created upon startup of the system upon which the server manager is located. In addition, the properties file may also include information for trusted hosts, wherein the system upon which the server manager is installed may only communicate with other systems that are listed as a trusted host. In other embodiments, the properties file is created by the agent system 110 before being communicated to the administrative server 130 and the managed servers 150. This file may be created based at least in part on data supplied to the agent system 110 from a user. In other embodiments, configuring the server manager may also include defining security protocols for the servers on the system.

In some embodiments, it may be necessary to start the server manager in order for configuration to be complete. In such an instance, the agent system 110 may be configured to communicate a request to the administrative server 130 and the managed servers 150 to start the server manager installed on each system. In other embodiments, the agent system 110 may communicate a message to a user to notify the user to start the server managers manually.

At block 206 a domain 109 is created for the application server 108. In some embodiments, the agent system 110 communicates a request to the application server 108 to execute a script which configures and creates the domain. In some embodiments, the script further packs the domain for distribution to the administrative server 130 and the managed servers 150.

At block 208 the managed servers 150 are initialized. In some embodiments of the invention, the agent system 110 communicates requests 150 for the purpose of configuring and installing software components on the managed servers. In some embodiments, the request from the agent system 110 may require the managed servers 150 to execute files located within the file system 156. In some embodiments, testing is performed on the managed servers after the initialization of the managed servers 150 to determine the functionality of the installed software.

Referring now to FIG. 5, a flowchart illustrating operations 300 for creating the domain 109 for the application server 108. As represented in block 302 ports of the application server 108 are configured. In some embodiments of the invention, when communicating over a network, each application that is executed on a server has a port associated with the application. Communication directed to a given port is forwarded to the application associated with the port. In some instances, servers will have reserved ports for standard applications already running on the server. For example, a server may reserve port 22 for a secure shell (SSH) application. Because some ports may be reserved, it is necessary in setting up the domain to determine what ports have been reserved for other applications. The agent system 110 could be configured to send a request to the administrative server 130 and the managed servers 150 to execute a script stored on the system to determine which ports the individual servers have reserved and which ports are available. In other embodiments, the agent system 110 could send requests to each port of the administrative server 130 and the managed servers 150 to determine whether the port is in use or available.

In some embodiment, an entity server is configured to host multiple domains. In such a case, ports are calculated for each component within the domain based on an initial starting point. The initial starting point is determined by a project acronym (external, internal) and the name of the environment being built (production, integration testing). To prevent port conflicts between the multiple domains, a physical host can only host a domain once for each project acronym and environment. As an example a single host cannot host two production domains for a project made available externally, however a development environment domain and an integration testing environment domain for a project made externally can reside on a single host. The code that builds the domain calculates the ports for each domain such that ports for a single domain are grouped in a range. Each range of ports associated with a given domain includes a base port from which the remaining ranges of ports for the given domain are calculated. In some embodiments, the base port for a project acronym and domain is communicated to the build job by a user. The user may communicate the base port as part of spreadsheet wherein the spreadsheet determines the base port based in part on a given project acronym and environment name.

In other embodiments, following the creation of the first domain, the user could update the initial base port parameter, using a different project acronym and environment name, and then execute the build of a second domain. The code that builds the domain would then calculate the ports for the second domain and thereafter assign a range of ports to the components in the second domain.

As an example of the above discussion of port assignments, the base port number is calculated using an environmental variable associated with a domain hosted on the administrative server, where the environmental variable is calculated in a spreadsheet based on the project acronym and the environment provided from the user. For example, the spreadsheet converts a project acronym of external and a production environment value into an environmental variable of 1. The base port value would calculate the base port using the following calculation:

$$bp = 30000 + ((env-1) \times 1000)$$

Where:
bp=Base Port Value; and
env=Environmental Variable

In such as instance, the spreadsheet would calculate a base port of 30000 based upon the project acronym of external and the environment name of production.

The code that builds the domain next calculates the range of ports associated with the domain using a for-loop and an incremental value. In some embodiments, the incremental value is calculated by the code that builds the domain. After the code that builds the domain has calculated the ports for the administrative server in the domain, the code that builds the domain further configures additional port values for each component. These values may include a protocol associated with the port such as Hyper Text Transfer Protocol (HTTP), Hyper Text Transfer Protocol Secure (HTTPS); a local administrative override port; and a cluster port.

After the ports are configured, a determination is made as to whether a domain 109 exists. (See block 304). As explained above, the domain 109 is a configuration of a server that directs the server as to whether it may properly communicate with other servers located in the domain 109 and how a server is managed. For example, in one embodiment of the invention, the managed servers 150 are located within the same domain 109 as the administrative server 130. The administrative server 130 is able perform management functions for the managed servers 150. In other embodiments, the managed servers 150 may be located on several application servers where each administrative server 130 is unique for each domain 109. In such a case, only managed servers 150 located within the same domain 109 may communicate with one another. However, each managed server 150 may communicate with the associated server 130. Although the domain 109 is used by the administrative server 130 and the managed servers 150, the domain is created 109 by the application server 108. In some embodiments, the domain for the system may be created automatically upon initialization of the application server 108. In other embodiments, the domain 109 is setup manually as part of the installation process of the web management software. Determining whether the domain exists may be accomplished by the agent system 110 sending a request to the application server 108 to execute a command wherein the application server 108 determines whether the domain 109 exists. In some embodiments of the invention, if the domain 109 exists, the web management software may not install properly on the administrative server 130 and the managed servers 150. As such, if the domain 109 is present, it will be necessary to either remove the domain 109 before proceeding or abort the installation process of the web management software.

If a domain exists, the agent 110 will terminate the installation and communicate to a user to manually check the host. (See block 305). The agent system is configured to receive, from a user, a new host for the domain. In the event the configuration of the domain resulted in an error, the agent system 110 is configured to remove the installation of the web management software and communicate to the user, the fault. The system is further configured to receive a response from the user to reinitiate the installation process. In some embodiments, if a domain already exists on the host, the agent system receives a new host for configuring the domain. In other embodiments, where the host contains a domain, the agent system is configured to abort the installation of the web management software. Aborting the installation of the web management software may include the agent system performing functions necessary to remove the web management software on the administrative server and the managed servers such that the installation could be restarted. In some embodiments, the domain may be removed by the agent system 110 communicating to the application server 108 a request to execute a command to remove the domain 109.

When the domain 109 is found not to exist (see block 304) or the domain from a failed attempt to configure the domain was removed (see block 305), the system creates the domain 109 for the application server 109. (See block 306). In some embodiments, the agent system 110 may be configured to send a request to the application server 108 to execute a script stored on the application server 108 to install the domain. In some embodiments, the agent system 110 may prompt a user to supply parameters needed to create and configure the domain. In other embodiments, the agent system 110 may receive the parameters from a file. In some embodiments of the invention, the script may direct the application server 108 to execute other scripts or executable files.

Next the administrative server 130 is configured (see block 308). In some embodiments, the application server 108 has functionality to start and stop the administrative server 130 and the managed servers 150 that are associated with it. Where the administrative server 130 is associated with the application server 108, the agent system 110 communicates a request to the application server 108 to start the administrative server 130. In other embodiments, the agent system 130 communicates a message to a user to start the administrative server 130 manually.

In some embodiments of the invention, in starting and configuring the administrative server 130, the virtual machine 146 for the administrative server 130 may be configured as well. In some embodiments, it is necessary to perform and startup and shutdown of the virtual machine 146 thus allowing the virtual machine to establish initial parameters necessary for proper operation. In some embodiments, the agent system 110 sends a request to the administrative server to execute a script for the purpose of starting up the virtual machine 146. The agent system 110 can be configured to communicate with the administrative server 130 to determine whether the virtual machine has successfully performed the startup. Upon receiving confirmation that the virtual machine has been successfully started, the agent system 110 could be configured to send a command to the administrative server 130 for shutting down the virtual machine 146. The agent system 110 can be further configured to communicate with the administrative server 130 to determine whether the virtual machine 146 has been successfully shut down.

The domain is then transferred. (See block 310). In some embodiments, the domain 109 is represented by a set of configuration files that are created by the application server 108. In order for either the administrative server 130 or the managed servers 150 to communicate with other server on the domain 109, each server must be properly configured with the parameters of the set of configuration files of the domain 109. In some embodiments, the application server 108 is configured to consolidate the set of configuration files into a single compressed file. In some embodiments, the application server 108 communicates the compressed file containing the domain configuration to both the application server 130 and the managed servers 150.

The server manager 142 for the administrative server 130 is then configured and started. (See block 312). As was stated above, the server manager 142 is an application executed by the administrative server 130 that allows the administrative server 130 to manage the managed servers 150 on the domain 109. Examples of functions that the server manager 142 may perform are load balancing of the managed servers 130, starting and stopping applications being processed by the managed servers 130, and performing redundancy checks such as starting an application on a given managed server if another managed server becomes unresponsive. The server manager 142 may be started by means of the agent system 110 sending a request to the administrative server to start the server manager 142.

Referring now to FIG. 6, a flowchart illustrating method 400 for initializing administrative 130 and managed servers 150. The managed servers 150 are initialized (See block 402). In some embodiments, the agent system sends a request to the managed servers 150 to perform a startup operation of the virtual machines. In some embodiments of the invention, the managed servers are configured to start the virtual machine 166 associated with the managed server 150. In some embodiments of the invention the virtual machine 166 is configured to host specific web applications stored on the managed servers 150. Each managed server may comprise the functionality to start and stop web applications and also direct requests to the web application communicated from a client to the managed server.

In some embodiments, during initialization of the managed servers 150 ports are configured on the managed servers 150. Each port is associated with a web application. A client may communicate a request to the managed server hosting the web application and specify a port in the request. The managed server may have the functionality to interpret the port and redirect the request to the application server associated with the port. The request may be directed in a protocol that is shared between the client and the managed servers 150. For example, the protocol may be based upon a specific protocol such as Transmission Control Protocol/Internet Protocol (TCP/IP). Further the protocol may have another layer by which information is transmitted between the client and the managed servers 150. For example, the client may transfer data using the Hyper Text Transfer Protocol (HTTP) or some other protocol. In some embodiments, upon receiving the request from the client, the web application may process the request, preform functionality associated with the request and return a response to the client. For example, the client may direct a request to the managed server using the TCP/IP and communicating data using HTTP. The request may contain a directive to port 80 on the managed server. The manage server hosts a web application that is linked to port 80. Upon receiving the request, the managed server directs the request to the web application associated with port 80. The web application is configured to return a message upon receiving a request. Upon receiving the request, the web application communicates the message back to the client.

In some embodiments, the web application may handle multiple requests simultaneously while in other embodiments, it handles a queue of requests each of which are handled in the order by which they are received. In some embodiments, the web application creates a session with the client wherein a direct communication link is formed between the client and the web application. The session may persist until the web application returns the response to the client or it may persist while multiple requests and responses are shared between the client and the web application. In such an embodiment, the web application may be configured to terminate the session upon the occurrence of an event.

In other embodiments, the client sends requests to the administrative server 130 instead of the managed servers 150. In such an embodiment, the administrative server 130 is configured to handle the requests and redirect the requests to the managed servers.

In some embodiments, during initialization of the managed servers 150, the agent system 108 may be configured to send a request to each managed server 150 directing the managed server to configure ports associated with a given number of web applications associated with the web management software.

In some embodiments, initializing the managed servers further comprise installing web applications on the managed servers 150. The web applications may be installed by the agent system 108 communicating a request to the managed servers to execute a file located on the managed servers 150 thereby causing the computer processing device 154 to install the web application. During the installation process of the web application, the managed server may specify the port to which the application is assigned. In some embodiments, the web applications are associated with the web management software.

Next, the agent system sets ownership and permission for uploaded files (See block 402). In some embodiments of the invention, the managed servers 150 utilize a permission based file system wherein the system is configured to associate files with a user and each file has a set of permissions to whether a particular user can execute the file. For example, a system may be configured with a user and group ownership and a file that is available for execution by the user. If a different second user attempts to execute the file, the system can be configured to return an error and not execute the file. The file may further be configured to allow execution by any user on the system wherein if any user attempted to execute the file, the system would execute the file. A user as defined in this section is a record stored in the file system of a computer and does not necessarily refer to an actual person but may refer to a fictitious person created by the server for the purpose of executing programs. For example, a server may create a system for executing programs associated with a particular application or set of applications. The user is not referenced to any living person but executable files stored on the server may be associated with the user. In some embodiments, a server must perform a function as a user. For example, if the agent system 110 sends a request to a managed server 150 it must send the request for a user to perform the function. If the user has permission to perform the function, the system executes the function. However, if the user does not have permission to execute the function, the managed server 150 communicates an error to the agent system 110. In some embodiments, the agent system 110 communicates a request to the managed servers 150 to setup a user and associate installation files located within the file system 156 with the user.

The managed servers 150 unpack the domain 109 (See block 404). In some embodiments, the packed domain is communicated to the managed servers 150. The managed servers 150 each receive the packed domain and store the packed domain in the file system 156. In some embodiments, the agent system 110 communicates a request to the managed servers to execute a script for unpacking the domain. After unpacking the domain 109, the managed system creates various files necessary for configuring the managed server to be associated with the domain 109. In some embodiments of the invention, the managed server is configured to the domain 109 by starting the server manager 162 associated with the managed server. Upon starting the server manager 162, the managed server may communicate with the administrative server by which the administrative server 130 may perform administrative functions on the managed server and may communicate requests sent from a client to the managed server.

The agent system 110 tests the functionality of the application server 108 (See block 408). In some embodiments the agent system 110 is receives the results from a series of tests wherein the tests are associated with functionality of web applications hosted by the administrative server 130 and the managed servers 150. Each test may comprise a set of parameters for testing the functionality and a desired response from the web application. The agent system may be configured to communicate the request to the web application of the managed server by which the web application processes the response based on the parameters and communicates a response back to the agent system 108. The agent system may then compare the response from the web application with the desired response and determine whether the test was satisfactorily performed. For example, a managed server may host a web application on port 80 that contains the function to return a message upon receiving a parameter A with a value of B. The agent system may receive two tests which contain requests for the web application. The first test contains parameter A with a value of B, while the second test contains parameter A with a value of C. Each test further comprises a desired result. The first test contains a result wherein the message is returned from the web application, while the second test comprises a desired result wherein no message is returned from the web application. The agent system communicates the first request to the web application wherein the web application interprets parameter A with a value of B and communicates the message back to the agent system. The agent system receives the message and compares the message with the message of the desired result wherein the agent determines that the message was performed satisfactorily. The agent system may then communicate the second request to the web application, wherein the web application receives the request and interprets parameter A with a value of C. The web application then communicates no message to the agent system. Upon not receiving a message from the web application, the agent system may determine that the second test was performed satisfactorily. Additionally, on the event that the desired response does not match the actual response, the agent system may be configured to communicate a message that the test was not performed satisfactorily. In some embodiments, the test may be established to create an error on the web application and the desired response would be a message that the error occurred.

Next, the agent system optimizes the administrative server 130 and the managed servers 150 (See block 410) and exits the installation. In some embodiments, the agent system 110 is configured to communicate a request to the administrative server and the managed servers for removing installation files associated with the install process. The agent system 108 may be further configured to communicate a message that the installation process is complete.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for installing web management software, whereby the system communicates requests to entity servers for the purpose of executing instructions on the entity servers, the system comprising:
   a storage device with computer-readable program code stored thereon;
   a communication device; and
   a computer processing device operatively coupled to said storage device and said communication device, wherein said computer processing device is configured to execute the computer-readable program code stored on said storage device to:
   receive, via said communication device, installation parameters comprising hardware, software, and network information associated with an entity server;
   based upon the installation parameters, generate a list of commands to install web management software on the entity server, wherein each command in the list of commands is executable by the entity server for performing a function to install the web management software on the entity server;
   initiate a server communication session with the entity server; and
   for each command in the list of commands, communicate, via said communication device, a request comprising the command to be executed by the entity server, wherein the requests are sent in a selected order and at selected times to install web management software on the entity server.

2. The system of claim 1, wherein said computer processing device is further configured to execute the computer-readable program code stored on said storage device to communicate installation files executable by the entity server, wherein the installation files comprise instructions necessary for installing the web management software on the entity server.

3. The system of claim 1, wherein at least one of the commands comprises a desired completion status and an alternative function, and wherein said computer processing device, after communicating a request comprising said command to the entity server, said computer processing device is further configured to execute the computer-readable program code stored on said storage device to:
   receive a response comprising a completion status of the execution of said command by the entity server;
   compare the completion status against a desired completion status associated with the command; and
   perform the alternative function associated with said command based upon the comparison of the completion status and the desired completion status.

4. The system of claim 1, wherein each command in the list of commands further comprises a condition for executing the command; and wherein the computer processing device is further configured to execute the computer-readable program code stored on the storage device to analyze whether the condition is satisfied; and communicate the command based in part on the condition.

5. The system of claim 1, wherein said computer processing device is further configured to execute the computer-readable program code to perform functional testing of the web management software, wherein functional testing comprises:
- receiving a list of functions of the web management software;
- for each function in the list of functions, creating tests, wherein the tests comprise parameters and a desired response; and
- for each test:
  - communicating a request to the entity server comprising the parameters such that the entity server performs the function based upon the parameters;
  - based upon communicating the request, receiving a response from the entity server; and
  - comparing the response from the entity server with the desired response associated with the test.

6. The system of claim 1, wherein a command in the list of commands sent to the entity server by said computer processing device may comprise instructions for the entity server to perform at least one of executing a file on the entity server, starting an application associated with the entity server, stopping an application associated with the entity server, sending a request to another server, and/or restarting the entity server.

7. The system of claim 1, wherein the entity server further comprises web applications stored therein that are managed by the web management software, and wherein at least one request communicated to the entity server by said computer processing device comprises at least one command for configuring the web application, starting the web application, stopping the web application, and/or setting network parameters for the web application.

8. A computer program product stored on a non-transitory computer readable medium, comprising software instructions for operation by a computer controller for installing web management software on an entity server, said software instructions comprising:
- a first executable portion configured for receiving installation parameters comprising hardware, software, and network information of an entity server;
- a second executable portion configured for, based upon the installation parameters, generating a list of commands to install web management software on the entity server, wherein each command in the list of commands is executable by the entity server for performing a function to install the web management software on the entity server;
- a third executable portion configured for, initiating a server communication session with the entity server; and
- a fourth executable portion configured for, for each command in the list of commands, communicating a request comprising the command to be executed by the entity server, wherein the requests are sent in a selected order and at selected times to install web management software on the entity server.

9. The computer program product of claim 8, wherein the computer program code further comprises a fifth executable portion configured to communicate installation files executable by the entity server wherein the installation files comprise instructions for installing the web management software on the entity server.

10. The computer program product of claim 8, wherein said fourth executable portion is further configured to:
- receive a response comprising a completion status of the entity server execution of said command;
- compare the completion status against a desired completion status associated with the command; and
- perform an alternative function based upon the comparison of the completion status and the desired completion status.

11. The computer program product of claim 8, wherein each command in the list of commands further comprises a condition for executing the command; and wherein fourth executable portion is configured to analyze whether the condition is satisfied; and communicate the command based in part on the satisfaction of the condition.

12. The computer program product of claim 8, wherein the computer program code further comprises a fifth executable portion configured to perform functional testing of the web management software, wherein said fifth executable portion comprises instructions for:
- receiving a list of functions of the web management software;
- for each function in the list of functions, creating tests, wherein the tests comprise parameters and a desired response; and
- for each test:
  - communicating a request to the entity server comprising the parameters such that the entity server performs the function based upon the parameters and communicates a response;
  - based upon communicating the request, receiving a response from the entity server; and
  - comparing the response from the entity server with the desired response of the test.

13. The computer program product of claim 8, wherein a command in the list of commands sent to the entity server via said fourth executable portion may comprise instructions for the entity server to perform at least one of executing a file on the entity server, starting an application associated with the entity server, stopping an application associated with the entity server, sending a request to another server, and/or restarting the entity server.

14. The computer program product of claim 8, wherein the web management software comprises web applications managed by the web management software, and wherein at least one request communicated to the entity server by said fourth executable portion comprises at least one of instructions for configuring the web application, starting the web application, stopping the web application, and/or setting network parameters for the web application.

15. A method implemented by a computerized apparatus configured for installing web management software, whereby the method communicates requests to entity servers for the purpose of executing instructions on the entity servers the method comprising:
- receiving installation parameters comprising hardware, software, and network information of an entity server;
- based upon the installation parameters, generating a list of commands to install web management software on the entity server, wherein each command in the list of commands is executable by the entity server for performing a function to install the web management software on the entity server;
- initiating a server communication session with the entity server; and
- for each command in the list of commands, communicating a request comprising the command to be executed by the entity server, wherein the requests are sent in a selected order and at selected times to install web management software on the entity server.

16. The method of claim 15, wherein said computer processing device is further configured to execute the computer-readable program code to communicate installation files executable by the entity server wherein the installation files comprise instructions for installing the web management software on the entity server.

17. The method of claim 15, wherein at least one of the commands comprises a desired completion status and an alternative function, and wherein communicating the request further comprises:

receiving a response comprising a completion status of the execution of said command by the entity server;

comparing the completion status against a desired completion status associated with the command; and performing the alternative function associated with said command based upon the comparison of the completion status and the desired completion status.

18. The system of claim 15, wherein each command in the list of commands further comprises a condition for executing the command; and wherein communicating the request further comprises analyzing whether the condition is satisfied; and communicate the command based in part on the satisfaction of the condition.

19. The method of claim 15 further comprising functional testing of the web management software, wherein functional testing comprises:

receiving a list of functions of the web management software;

for each function in the list of functions, creating tests, wherein the tests comprise parameters and a desired response; and for each test:

communicating a request to the entity server comprising the parameters such that the entity server performs the function based upon the parameters and communicates a response;

based upon communicating the request, receiving a response from the entity server; and comparing the response from the entity server with the desired response of the test.

20. The method of claim 15, wherein a command in the list of commands sent to the entity server may comprise instructions for the entity server to perform at least one of executing a file on the entity server, starting an application associated with the entity server, stopping an application associated with the entity server, sending a request to another server, and/or restarting the entity server.

21. The method of claim 15, wherein the web management software comprises web applications managed by the web management software, and wherein communicating a request to the entity server comprises at least one request for configuring the web application, starting the web application, stopping the web application, and/or setting network parameters for the web application.

* * * * *